US007031461B2

(12) United States Patent
Lipari, II et al.

(10) Patent No.: US 7,031,461 B2
(45) Date of Patent: Apr. 18, 2006

(54) ROBUST ADAPTIVE FILTER FOR ECHO CANCELLATION

(75) Inventors: Charles Anthony Lipari, II, Tempe, AZ (US); Alexander Volkov, Gilbert, AZ (US)

(73) Assignee: Acoustic Technologies, Inc., Mesa, AZ (US)

(*) Notice: Subject to any disclaimer, the term of this patent is extended or adjusted under 35 U.S.C. 154(b) by 7 days.

(21) Appl. No.: 10/756,227

(22) Filed: Jan. 12, 2004

(65) Prior Publication Data

US 2005/0152534 A1 Jul. 14, 2005

(51) Int. Cl.
*H04M 9/08* (2006.01)

(52) U.S. Cl. .......................... 379/406.08; 379/406.09; 379/406.01; 379/406.05; 379/406.06

(58) Field of Classification Search ...................... 379/406.01–407.16; 381/71.11–71.14; 370/290–292; 708/322
See application file for complete search history.

(56) References Cited

U.S. PATENT DOCUMENTS

| | | | | |
|---|---|---|---|---|
| 5,384,853 | A * | 1/1995 | Kinoshita et al. | 381/71.12 |
| 5,410,595 | A * | 4/1995 | Park et al. | 379/406.08 |
| 5,949,894 | A * | 9/1999 | Nelson et al. | 381/300 |
| 6,223,194 | B1 * | 4/2001 | Koike | 708/322 |
| 6,377,682 | B1 | 4/2002 | Benesty et al. | 379/406.01 |
| 2003/0219113 | A1 * | 11/2003 | Bershad et al. | 379/406.01 |

OTHER PUBLICATIONS

Elliot et al , "A Multiple Error LMS Algorithm and Its Application to the Active Control of Sound and Vibration", 1987, IEEE Trans. on Acoustics, Speech, and Signal Processing, vol. ASSP-35, No. 10, Oct. 1987, pp. 1423-1434.*
Elliott et al, "A Multiple Error LMS Algorithm and Its Application to the Active Control of Sound and Vibration", IEEE Trans. on ASSP, vol. ASSP-35, No. 10, Oct. 1987.*
S. Makino, Y. Kaneda, and N. Koizumi, "Exponentially Weighted Stepsize NLMS Adaptive Filter Based on the Statistics of a Room Impulse Response", *IEEE Trans. on Speech and Audio Processing*, vol. 1, No. 1, Jan. 1993, pp. 101-108.
S. Douglas, "Analysis of the Multiple-Error and Block Least-Mean_Square Adaptive Algorithms", *IEEE Transactions on Circuits and Systems—II: Analog and Digital Signal Processing*, vol. 42, No. 2, Feb. 1995.

* cited by examiner

*Primary Examiner*—Sinh Tran
*Assistant Examiner*—Ramnandan Singh
(74) *Attorney, Agent, or Firm*—Paul F. Wille

(57) ABSTRACT

An adaptive filter is programmed with an algorithm based on a normalized Least Mean Squares (nLMS) algorithm that adapts each sample time. The algorithm is modified to be more efficient in a variety of DSPs by computing multiple errors, one per sample, before updating coefficients. The update equation utilizes the multiple errors to achieve adaptation at a similar performance to known nLMS algorithms that adapt each sample time but without the instability that is observed in low echo-to-near-end-noise ratio (ENR) input conditions. Varying the relaxation step size prevents divergence. The DSP utilizes either one or more MAC units.

10 Claims, 4 Drawing Sheets

ROBUST ADAPTIVE FILTER FOR ECHO CANCELLATION

BACKGROUND OF THE INVENTION

This invention relates to a telephone employing adaptive filters for echo canceling and noise reduction and, in particular, to an adaptive filter that adapts quickly even in low signal to noise conditions.

As used herein, "telephone" is a generic term for a communication device that utilizes, directly or indirectly, a dial tone from a licensed service provider. As such, "telephone" includes desk telephones (see FIG. 1), cordless telephones (see FIG. 2), speaker phones (see FIG. 3), hands free kits (see FIG. 4), and cellular telephones (see FIG. 5), among others. For the sake of simplicity, the invention is described in the context of telephones but has broader utility; e.g. communication devices that do not utilize a dial tone, such as radio frequency transceivers.

There are two kinds of echo in a telephone system, an acoustic echo between an earphone or a loudspeaker and a microphone and electrical echo generated in the switched network for routing a call between stations. In a handset, acoustic echo is typically not much of a problem. In speaker phones, where several people huddle around a microphone and loudspeaker, acoustic feedback is much more of a problem. Hybrid circuits (two-wire to four-wire transformers) located at terminal exchanges or in remote subscriber stages of a fixed network are the principal sources of electrical echo.

One way to reduce echo is to program the frequency response of a filter to match the frequency content of an echo. A filter typically used is a finite impulse response (FIR) filter having programmable coefficients. The echo is subtracted from the echo bearing signal at the microphone. This technique can reduce echo as much as 30 dB, depending upon the coefficient adaptation algorithm. Additional means using non-linear techniques are typically added to further reduce an echo. Approximating a solution for an adaptive filter is like trying clothes on a squirming child: the input signal keeps changing. At one extreme, sudden and/or large changes can upset the approximation process and make the process diverge rather than converge. At the other extreme, a low echo to noise ratio can cause instability.

A robust filter for echo cancellation is known in the art; U.S. Pat. No. 6,377,682 (Benesty et al.), the entire contents of which is incorporated by reference herein. As used in the patent, "robust" means "insensitivity to small deviations of the real distribution from the assumed model distribution." A more functional or practical definition is that robust means insensitivity to outside disturbing influences, such as near-end talk or noise.

Convergence relates to a process for approximating an answer. In high school, one is taught how to calculate the roots of a quadratic equation f(x)=0 from the coefficients of the terms on the left side of the equation. This is not the only way to solve the problem. One can simply substitute a value (a guess) for x in the equation and calculate an answer. The guess is modified depending upon the difference (the error) between the calculated answer and zero. The error could be as large numerically as the guess. Thus, some fraction of the error is typically used to adjust the guess. Hopefully, successive guesses come closer and closer to a root. This is convergence. Calculations stop when the size of the error becomes arbitrarily small. For a human being, this approach is time consuming and boring. For a computer, this approach is extremely useful and applicable to many situations other than solving quadratic equations.

A simple fraction is a linear error function. If the fraction is small, convergence is slow. Fast convergence is desired to avoid double talk (both parties talking) or other errors during adaptation. If the fraction is large, successive calculations could diverge rather than converge. The Benesty et al. patent discloses that robustness is obtained by using a non-linear function of the error to determine successive approximations of coefficients for modeling the echo path.

The Benesty et al. patent relies on a Fast Recursive Least Squares (FRLS) algorithm for adapting a programmable FIR (finite impulse response) filter. Other algorithms are known in the art, such as normalized Least Mean Squares (nLMS). It is also known in the art to vary the step size of an nLMS filter; see S. Makino, Y. Kaneda, and N. Koizumi, "Exponentially Weighted Stepsize NLMS Adaptive Filter Based on the Statistics of a Room Impulse Response, *IEEE Trans. on Speech and Audio Processing*, Vol. 1, No. 1, January 1993, pages 101–108.

A digital signal processor (DSP) can be programmed according to any one of the available algorithms. There are at least two problems associated with implementing an algorithm on a DSP. A first problem is that the implementation may be unique to a particular processor. This is undesirable because it ties the implementation to the availability of a single semiconductor device. A second problem is that the implementation may not be efficient.

"Efficiency" in a programming sense is the number of instructions required to perform a function. Few instructions are better or more efficient than many instructions. In languages other than machine (assembly) language, a line of code may involve hundreds of instructions. As used herein, "efficiency" relates to machine language instructions, not lines of code, because it is the number of instructions that can be executed per unit time that determines how long it takes to perform an operation or to perform some function.

Stability is also affected by the range and resolution of the DSP. Poor resolution in a fixed point DSP (too few bits) can cause bad echo cancellation. For example, resolution and range are conflicting requirements in a fixed-point implementation. A solution is to use the MAC (Multiply/ACcumulate) function available in some DSPs. Some commercially available DSPs include two or more MAC units. Stability is also affected by the ability of the cancellation algorithm to operate in noise and double-talk.

In view of the foregoing, it is therefore an object of the invention to provide an efficient adaptive filter that is stable during noise and double talk, yet has fast convergence to an echo cancellation solution.

Another object of the invention is to provide an efficient method for adapting a programmable filter.

A further object of the invention is to provide an efficient and robust adaptive filter for noise reduction that is relatively machine independent; i.e. not tied to a single processor.

Another object of the invention is to provide a robust adaptive filter that is stable when the echo is nearly the same as near end noise.

SUMMARY OF THE INVENTION

The foregoing objects are achieved in this invention in which an adaptive filter is programmed with an algorithm based on a normalized Least Mean Squares (nLMS) algorithm that adapts each sample time. The algorithm is modified to be more efficient in a variety of DSPs by computing multiple errors, one per sample, before updating coefficients. The update equation utilizes the multiple errors to achieve adaptation at a similar performance to known nLMS algorithms that adapt each sample time but without the instability that is observed in low echo-to-near-end-noise ratio (ENR) input conditions. Varying the relaxation step size prevents divergence. The DSP utilizes one or more MAC units.

BRIEF DESCRIPTION OF THE DRAWINGS

A more complete understanding of the invention can be obtained by considering the following detailed description in conjunction with the accompanying drawings, in which.

Those of skill in the art recognize that, once an analog signal is converted to digital form, all subsequent operations can take place in one or more suitably programmed microprocessors. Reference to "signal", for example, does not necessarily mean a hardware implementation or an analog signal. Data in memory, even a single bit, can be a signal. In other words, a block diagram can be interpreted as hardware, software, e.g. a flow chart, or a mixture of hardware and software. Programming a microprocessor is well within the ability of those of ordinary skill in the art, either individually or in groups.

DETAILED DESCRIPTION OF THE INVENTION

Figure 1:
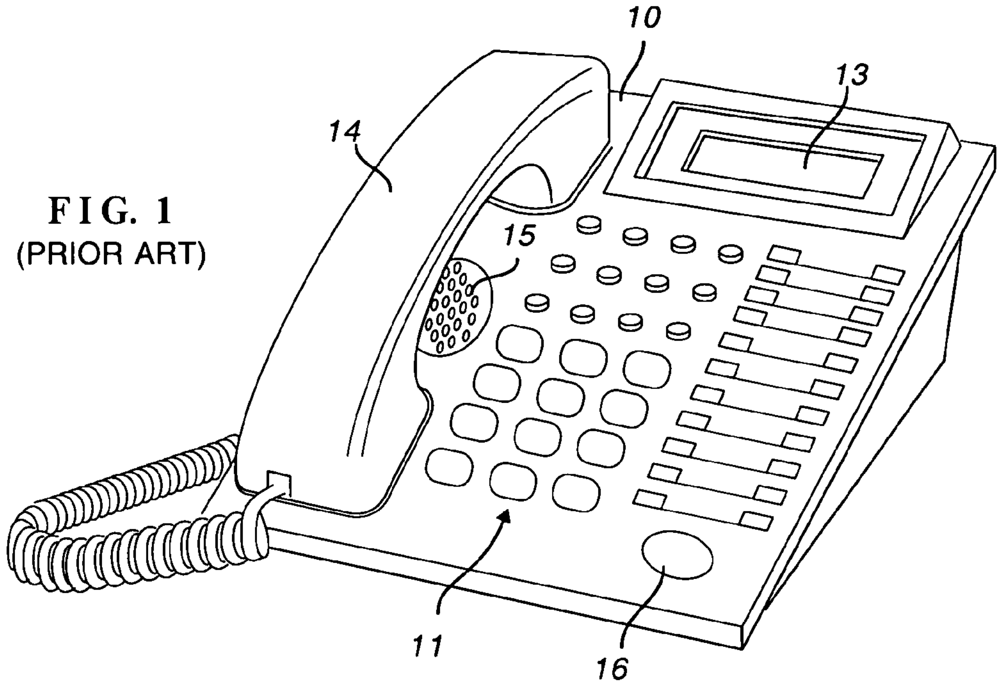
FIG. 1 is a perspective view of a desk telephone.
Figure 2:
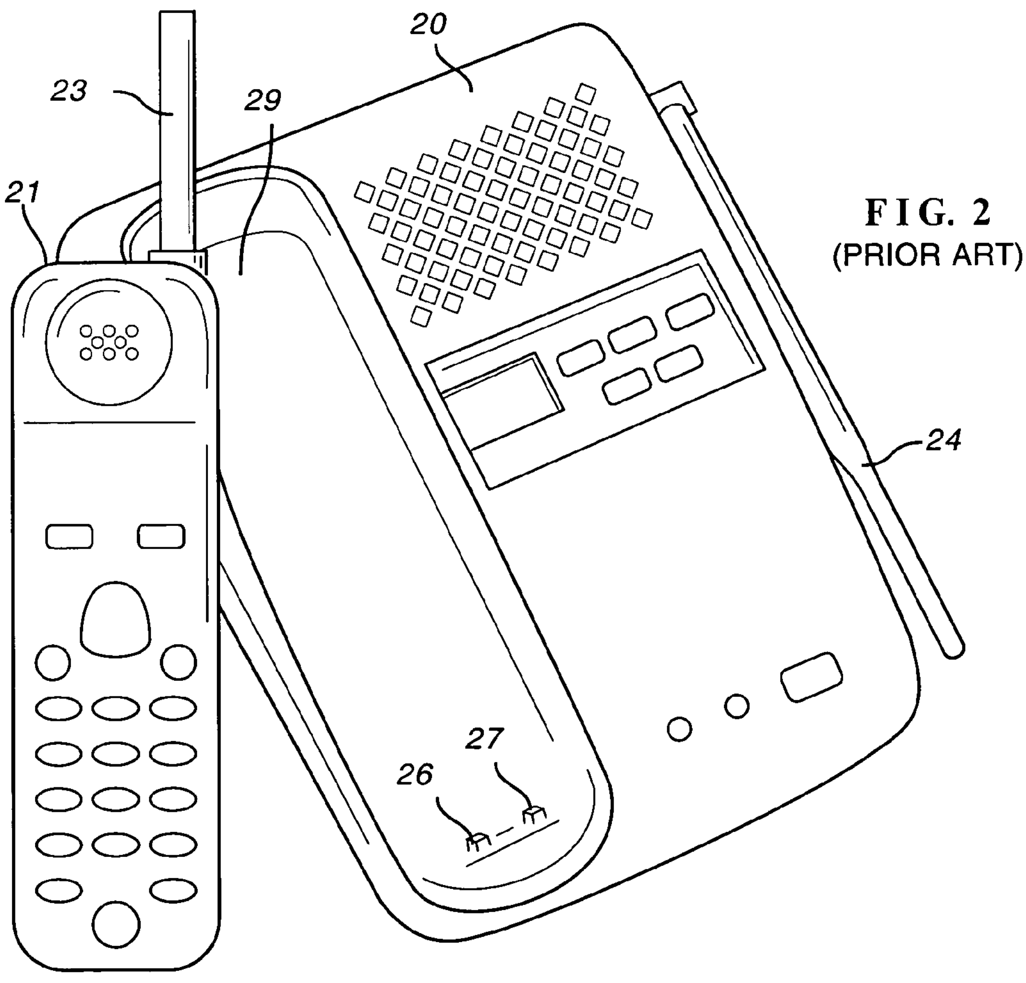
FIG. 2 is a perspective view of a cordless telephone.

This invention finds use in many applications where the electronics is essentially the same but the external appearance of the device may vary. FIG. 1 illustrates a desk telephone including base 10, keypad 11, display 13 and handset 14. As illustrated in FIG. 1, the telephone has speaker phone capability including speaker 15 and microphone 16. The cordless telephone illustrated in FIG. 2 is similar except that base 20 and handset 21 are coupled by radio frequency signals, instead of a cord, through antennas 23 and 24. Power for handset 21 is supplied by internal batteries (not shown) charged through terminals 26 and 27 in base 20 when the handset rests in cradle 29.

Figure 3:
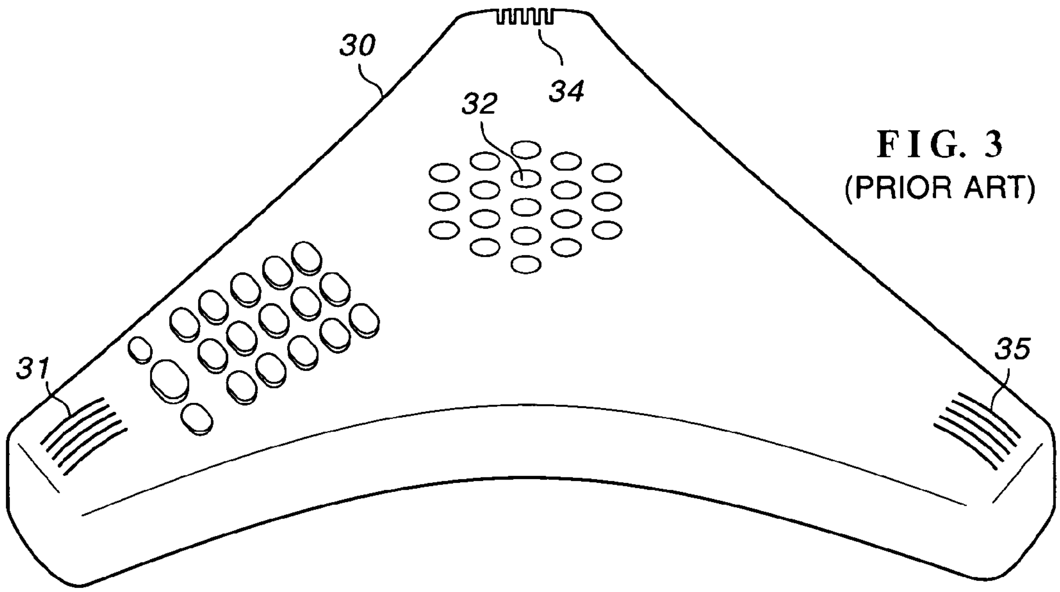
FIG. 3 is a perspective view of a conference phone or a speaker phone.

FIG. 3 illustrates a conference phone or speaker phone such as found in business offices. Telephone 30 includes microphone 31 and speaker 32 in a sculptured case. Telephone 30 may include several microphones, such as microphones 34 and 35 to improve voice reception or to provide several inputs for echo rejection or noise rejection, as disclosed in U.S. Pat. No. 5,138,651 (Sudo).

Figure 4:
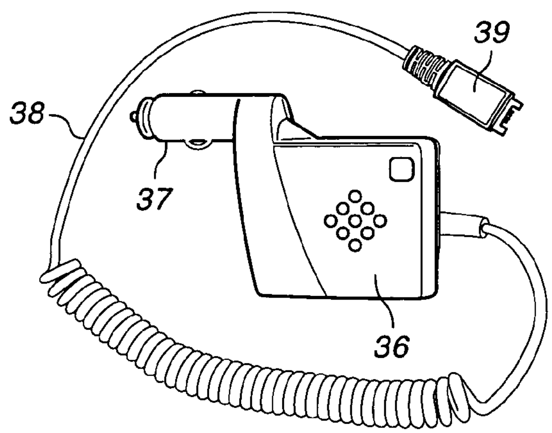
FIG. 4 is a perspective view of a hands free kit.
Figure 5:
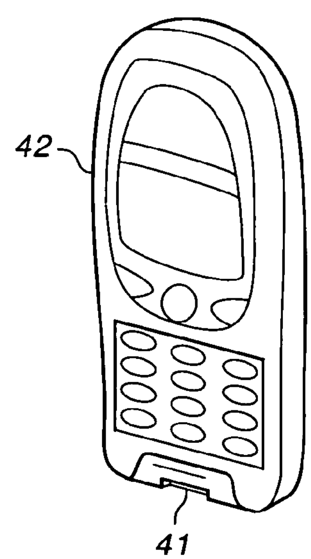
FIG. 5 is a perspective view of a cellular telephone.

FIG. 4 illustrates what is known as a hands free kit for providing audio coupling to a cellular telephone, illustrated in FIG. 5. Hands free kits come in a variety of implementations but generally include powered speaker 36 attached to plug 37, which fits an accessory outlet or a cigarette lighter socket in a vehicle. A hands free kit also includes cable 38 terminating in plug 39. Plug 39 fits the headset socket on a cellular telephone, such as socket 41 (FIG. 5) in cellular telephone 42. Some kits use RF signals, like a cordless phone, to couple to a telephone. A hands free kit also typically includes a volume control and some control switches, e.g. for going "off hook" to answer a call. A hands free kit also typically includes a visor microphone (not shown) that plugs into the kit. Audio processing circuitry constructed in accordance with the invention can be included in a hands free kit or in a cellular telephone.

Figure 6:
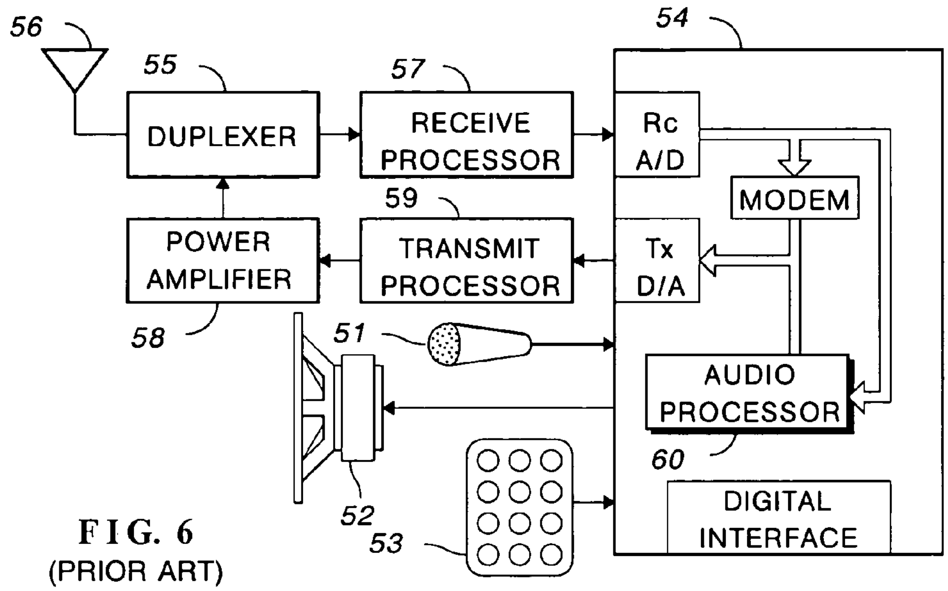
FIG. 6 is a generic block diagram of audio processing circuitry in a telephone.

The various forms of telephone can all benefit from the invention. FIG. 6 is a block diagram of the major components of a cellular telephone. Typically, the blocks correspond to integrated circuits implementing the indicated function. Microphone 51, speaker 52, and keypad 53 are coupled to signal processing circuit 54. Circuit 54 performs a plurality of functions and is known by several names in the art, differing by manufacturer. For example, Infineon calls circuit 54 a "single chip baseband IC." QualComm calls circuit 54 a "mobile station modem." The circuits from different manufacturers obviously differ in detail but, in general, the indicated functions are included.

A cellular telephone includes both audio frequency and radio frequency circuits. Duplexer 55 couples antenna 56 to receive processor 57. Duplexer 55 couples antenna 56 to power amplifier 58 and isolates receive processor 57 from the power amplifier during transmission. Transmit processor 59 modulates a radio frequency signal with an audio signal from circuit 54. In non-cellular applications, such as speakerphones, there are no radio frequency circuits and signal processor 54 may be simplified somewhat. Problems of echo cancellation and noise remain and are handled in audio processor 60. It is audio processor 60 that is modified to include the invention. How that modification takes place is more easily understood by considering the echo canceling and noise reduction portions of an audio processor in more detail.

Figure 7:
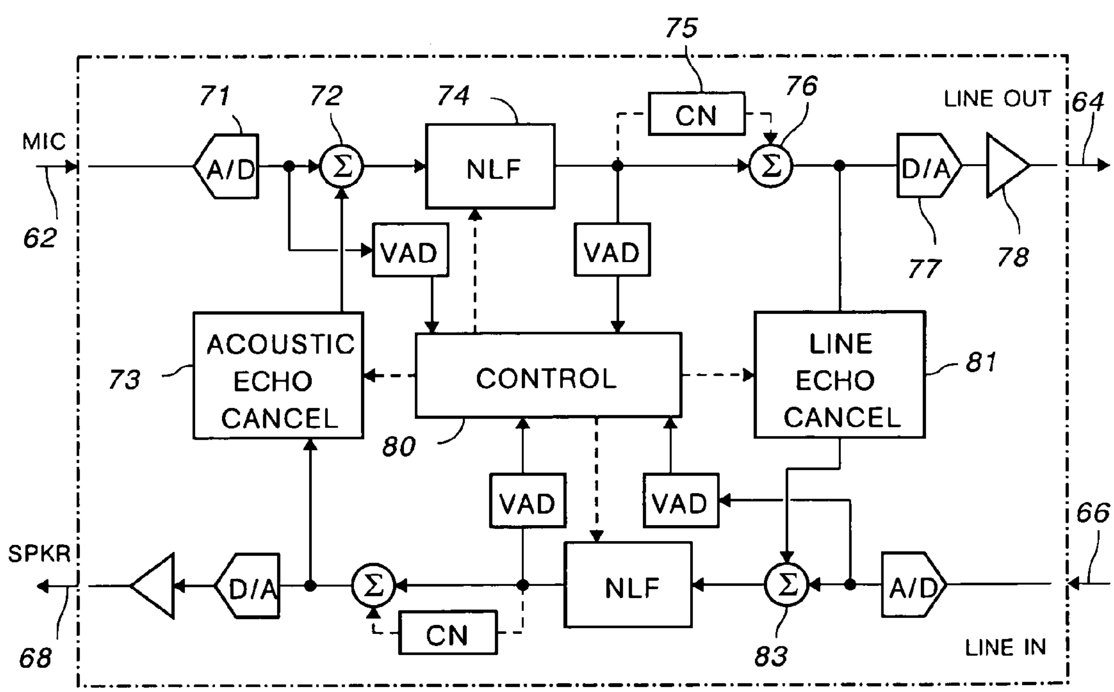
FIG. 7 is a more detailed block diagram of audio processing circuitry in a telephone.

FIG. 7 is a detailed block diagram of a noise reduction and echo canceling circuit; e.g. see chapter 6 of *Digital Signal Processing in Telecommunications* by Shenoi, Prentice-Hall, 1995, with the addition of four VAD circuits. The following describes signal flow through the transmit channel, from microphone input 62 to line output 64. The receive channel, from line input 66 to speaker output 68, works in the same way.

A new voice signal entering microphone input 62 may or may not be accompanied by a signal from speaker output 68. The signals from input 62 are digitized in A/D converter 71 and coupled to summation circuit 72. There is, as yet, no signal from echo canceling circuit 73 and the data proceeds to non-linear filter 74, which is initially set to minimum suppression.

The output from non-linear filter 74 is coupled to summation circuit 76, where comfort noise 75 is optionally added to the signal. The signal is then converted back to analog form by D/A converter 77, amplified in amplifier 78, and coupled to line output 64. Data from the four VAD circuits is supplied to control 80, which uses the data for allocating sub-bands, echo elimination, double talk detection, and other functions. Control circuit 40 (FIG. 7) can be part of control 80 or separate; e.g. as when located in a hands free kit. Circuit 73 reduces acoustic echo and circuit 81 reduces line echo. The operation of these last two circuits is known per se in the art; e.g. as described in the above-identified patent.

Figure 8:
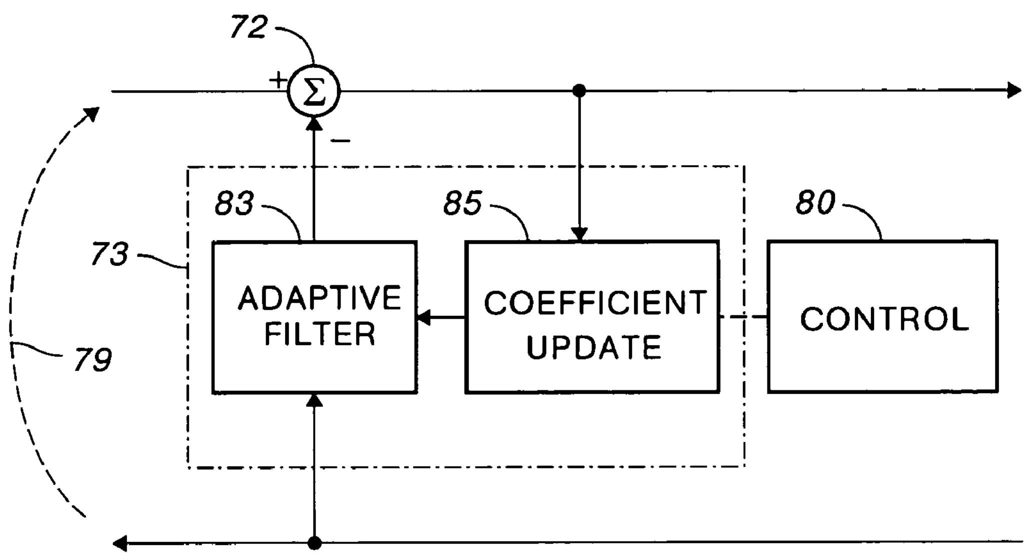
FIG. 8 is a block diagram of an acoustic echo canceller constructed in accordance with the invention.

FIG. 8 is a block diagram of acoustic echo canceller 73. Acoustic path 79 from a speaker (not shown in FIG. 8) to a microphone (not shown in FIG. 8) has a particular frequency response or, better, transfer function because both time delay and frequency are involved. The goal is to modify filter 83 to have the same transfer function. If so, any sound (echo) from the speaker to the microphone will match the signal from filter 83 to summation circuit 72. A perfect match will cause acoustic echo cancellation in summation circuit 72. The match is never perfect and other circuitry takes care of the residual echo. Assuming that no one is speaking into the microphone, the output from summation circuit 72 is an error signal that coefficient update circuit 85 seeks to minimize by adjusting the coefficients in adaptive filter 83. Control circuit 80 enables or disables adaptation according to conditions in the telephone, e.g. as sensed by the VAD circuits (FIG. 7). For example, during double talk conditions, adaptation is interrupted if ongoing or is delayed if not yet started. The logic for doing this is straightforward and well within the ability of one of ordinary skill in the art. A certain amount of error in double talk sensing (missed double talk) is mitigated by the robustness algorithm.

Figure 9:
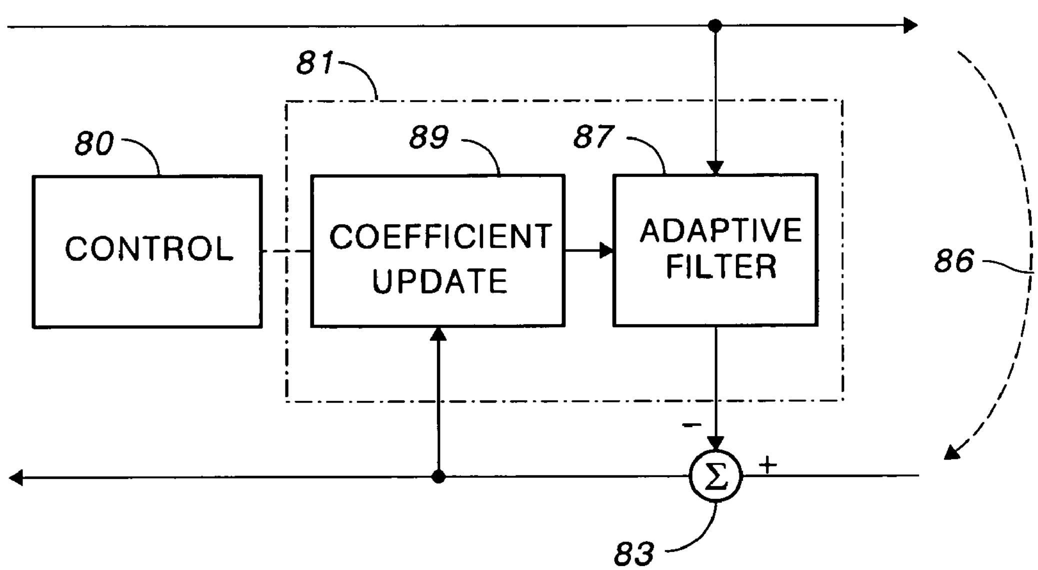
FIG. 9 is a block diagram of a line echo canceller constructed in accordance with the invention.

FIG. 9 is a block diagram of line echo canceller 81. Electronic path 86 from a line output (not shown in FIG. 9) to a line input (not shown in FIG. 9) has its own transfer function. The goal is to modify filter 87 to have the same transfer function. Coefficient update circuit 89 seeks to minimize an error signal by adjusting the coefficients in adaptive filter 87. Control circuit 80 enables or disables adaptation according to conditions in the telephone.

In accordance with the invention, a normalized Least Mean Squares (nLMS) algorithm, which adapts each sample time, is modified to compute multiple errors, one per sample, before updating coefficients. Multiple error update has been found to provide similar performance to standard nLMS adapting each sample time but with instability during low ENR conditions. The invention requires robustness to maintain stability. Several other aspects of the invention are described below: (1) Exponential Step Size Weighting, (2) Multiple Error Update, (3) Scaling Robustness for Stability, and (4) Scale Factor.

Implementation

The following definitions are used in the calculation of the coefficient update:

The vector of past inputs is given by the following equation.

$$x_k = x(k) = [x(k), x(k-1), \ldots x(k-L)]^T$$

$x_k$ refers to the past input x(k−1). L is the length of the FIR filter used to estimate the echo and k is the sample index.

The coefficient estimate vector (tap coefficients) is given by the following equation.

$$\hat{h}_k = \hat{h}(k) = [\hat{h}_1(k), \hat{h}_2(k), \ldots \hat{h}_L(k)]^T$$

The equations for dual-error nLMS adaptive filtering algorithm are as follows. $e_k = y_k - x_k^T \hat{h}_k$ gives the current error estimate for the current input, $p_k = x^T x + \delta$ is regularized power, where $\delta$ is the regularization parameter for the power normalization calculation (the value 0.001 has been used), and $\epsilon_k = e_k / p_k$ is the estimated error normalized by the power estimate. The coefficient estimate, $\hat{h}_k$, is updated using $\hat{h}_{k+1} = \hat{h}_{k-1} + \mu x_k \epsilon_k + \mu x_{k-1} \epsilon_{k-1}$, where $\mu$ is the relaxation step size.

A single MAC architecture will compute each error in a single-cycle per filter tap. A dual MAC architecture will compute both errors in a single-cycle per tap. The update equation can be similarly computed in two to four cycles per tap based on the number of MAC units, the resources to store the normalized errors as local operands for zero cycle fetching, and the ability to fetch operands and store results in parallel with the MAC unit operations. For example, this gives a total of 2.25 cycles per tap for a TMSC54xx processor (single MAC), 1.5 cycles per tap for a TMSC55xx processor (dual MAC), and 1.25 cycles per tap for a generic four MAC processor. Efficiency approaches one cycle per tap as the number of MACs increases.

The TMSC54xx and TMSC55xx processors calculate least mean square in a single machine instruction, which allows the error calculation and the coefficient update to be computed in two cycles per tap. Because the current error is being calculated as the coefficients are being updated, the previous error is used during calculation. Using the previous error also requires dual access memory rather than the single access memory for the dual error update. Dual error update does not require special memory, delayed errors, or a special LMS instruction, which is not available in many architectures. Thus, the invention can be used in many other architectures.

The step size, $\mu$, controls the convergence and stability of the algorithm. Modifications of the basic multiple error algorithm are needed to control stability while maintaining a fast convergence to the error minimum. The following sections describe how the standard nLMS algorithm has been modified to an algorithm in accordance with the invention.

Exponential Step Size Weighting

For an adaptive filter, the impulse response envelope is well modeled by a decaying exponential curve; see S. Makino, Y. Kaneda, and N. Koizumi, "Exponentially Weighted stepsize NLMS Adaptive Filter Based on the Statistics of a Room Impulse Response, *IEEE Trans. on Speech and Audio Processing*, Vol. 1, No. 1, January 1993. This a priori information is incorporated into the step size used for each coefficient update, allowing improved tracking and convergence. The network adaptive filter does not require exponential step size weighting.

More than one stepsize is used. The coefficient vector, $\hat{h}_k$, is partitioned into a block of taps starting from tap zero and the remaining taps are partitioned into N equal length contiguous blocks. In one embodiment of the invention, N=8. Each block coefficient uses a different stepsize, $\mu_i$ in the update. Initially, the stepsize is zero over the initial taps that correspond to a fixed delay. The remaining blocks of coefficients use step sizes calculated as follows.

1. The exponential step size values can be calculated using the $t_{60}$ value for the expected impulse response, i.e. the time it takes for the impulse response to be down by 60 dB. The stepsize is then be given by the following formula.

$$\mu_n = \mu A_0^{(n-1)(t60 * Fs)}$$

Fs is the sampling rate and n=1, . . . , N.
2. The initial stepsize (the relaxation parameter), $\mu_0$, on the range [0,1], is chosen to give the stability of the algorithm. This will also set the basic error convergence characteristic of the algorithm.

Note that network echo is usually much shorter than acoustic echo and the fixed delay is unknown. One embodiment of the invention used 0 ms fixed delay and a $t_{60}$ value greater than 400 ms.

Leakage

In the presence of certain types of inputs (for example narrow-band signals), the coefficients may drift from optimum values and grow slowly, eventually exceeding permissible word length. This is an inherent problem of the LMS algorithm; see Ifeachor and B. Jervis, *Digital Signal Processing: A Practical Approach*, Addison-Wesley, 1993, p. 556. The problem is overcome by introducing a coefficient leakage, that gently nudges the value toward zero. The leakage update equation using exponential steps that vary over the set of coefficients is as follows.

$$\hbar_k=\zeta*\hbar_k+Ax_k\epsilon_k$$

where $$A=\mathrm{diag}(0..0,\mu_{0,S_{f+1+1}}\ldots\mu_{0,S_{f+}}(L-S_{f)/N}\ldots\mu_{N-1,(N-1)(L-S_{f)/N+1}}\ldots\mu_{N,L})$$

For $\mu_{i,j}$, i is the index for the stepsize to use in this position and j is the tap number of this position. $\zeta$ is a term in the range of $[1-2^{-20},1-2^{-28}]$ that ensures that the drift is contained and also introduces a bias in the normalized error term $\epsilon_k$.

Multiple Error Update for DSP Acceleration

The single MAC calculation for one error per coefficient update, over one sample time, k, to update the FIR filter coefficients, and calculate the next error is:

1. $h_k \times x_{k+}A1 \rightarrow A1$; (MAC instruction for error computation, i.e. FIR filter)
2. $x_{k-1}\times\mu\times\epsilon_{k-1}+h_k\rightarrow h_k$; (Coefficient update using delayed error)

This is computed in two cycles per tap with a single MAC unit and a dual ported memory, using the delayed error LMS instruction, as follows.

- Initialize: Value $\mu_n \times e_{k-1}$ in memory M1; $e_k$ accumulator register B initialized to zero. $h_i$ and $x_i$ source pointers initialized to start of their respective array memories, $h_i$ destination pointer initialized to the start of coefficient array memory. The first tap update is computed outside the loop.
- Loop: (over all tap indices i using the contents of the registers and memory)
- Cycle 1: $x_{i,k-1}\times M1\rightarrow A$, $A\rightarrow h_{i,k-1}$, increment $h_i$ and $x_i$ destination pointers; (store coefficient update for current tap; point to next tap coefficient and delayed input; tap update multiply for next tap)
- Cycle 2: $h_{i,k}\times x_{i,k}+B\rightarrow B$, increment $x_i$ src pointer, $A+h_{i,k-1}\rightarrow A$ (LMS instruction: FIR convolution step, increment $x_i$ src pointer, compute tap update)

The TMS320C54xx or TMS320C55xx have the LMS instruction and dual ported memory to perform the parallel operations. There is no advantage in having the TMS320C55xx's second MAC unit for this calculation.

The tap update/dual error calculations using two errors per update is:

1. $h_{k-2}\times x_{k-1}\rightarrow e_{k-1}$; (error 1 computation, MAC instruction)
2. $h_{k-2}\times x_k\rightarrow e_k$; (error 2 computation, MAC instruction)
3. $x_{k-1}\times\epsilon_{k-1}+x_k\times\epsilon_k+h_{k-2}\rightarrow h_k$; (coefficient update using mu-normalized errors 1 and 2)

The tap vector is used twice to compute the filter output (errors) before it is updated. The DSP will compute the two errors and update each tap, i, over samples, k and k−1, as follows:

A:

$$\left\{\begin{matrix} h_{i,k-2}Xx_{i,k-1}+e_{k-1}\rightarrow e_{k-1} \\ h_{i,k-2}Xx_{i,k}+e_k\rightarrow e_k \end{matrix}\right\}$$

B: $h_i+x_i\times\epsilon_{k-1}+x_{i-1}\epsilon_k\rightarrow h_i$

A is computed first in 1 or 2 cycles per tap depending on the number of MAC units. The coefficient update, B, is then computed. The calculation of B depend on the number of accumulators and temporary registers.

For a TMSC54xx (single MAC unit, single temporary register ) the B calculation is:

- Init: $\mu_n\times\epsilon_1$ is in memory, M1; $\mu_n\times\epsilon_2$ is in memory, M2; initialize $h_i$ source and destination memory pointers to start of coefficient array memory; initialize the $x_i$ memory pointer to start of delayed input memory.
- Loop: (over all tap indices i using the contents of the registers and memory)
  - cycle 1: $x_i\times M2+A\rightarrow A$, increment $x_i$ pointer;
    (mu-normalized error 1 update term using MAC unit)
  - cycle 2: $x_i\times M1+A\rightarrow A$
    (mu-normalized error 2 update term using MAC unit)
  - cycle 3: $A\rightarrow h_i$, increment $h_i$ destination pointer, $h_i\rightarrow A$
    (store current tap coefficient, load next tap coefficient)

A and B together take five cycles every two samples on a C54xx processor. The total computation for each tap update for the C54xx processor is now: (2+3)/2=2.25 cycles/tap. Only single-port memory is required. Other single-MAC DSP processors (e.g. Teak-Lite) will have more than one temporary register, allowing more parallel operations and eliminating one cycle from the loop, giving (2+2)/2=2 cycles per tap.

The computation of B using a dual-MAc processor is as follows:

- Init: $\mu_n\times\epsilon_1$ is in memory, M1; $\mu_n\times\epsilon_2$ is in memory, M2; initialize $h_i$ source and destination memory pointers; initialize $x_i$ and $x_{i-1}$ source memory pointers.
- Loop: (over all tap indices i using the contents of the registers and memory)
  - cycle 1: $x_{i-1}\times M1\rightarrow B$, $x_i\times M2+A\rightarrow A$, increment $x_i$ pointer;
    (update terms calculated in parallel using dual MAC units)
  - cycle 2: $A+B\rightarrow h_i$, increment $x_{i-1}$ pointer, increment $h_i$ pointer
    (coefficient updater)
- This gives three cycles for a total of (1+2)/2=1.5 cycles/tap. Some processors will not allow the incrementing of both $h_i$ destination and $x_{i-1}$ source pointers in parallel, thus a different stratagy, using temporary registers, may be required, as given below:
- Init: $\mu_n\times\epsilon_1$ in T1 register, $\mu_n\times\epsilon_2$ is in T2 register; init $h_i$ destination and $x_i$ source and destination memory pointers. Accumulator A1 initialize to contents of $h_i$, and A0 initialize to contents of $h_{i-1}$.
- Loop: (Update two tap coefficients at a time over the full length of the filter using the contents of the registers and memory)

cycle 1: $x_i \times T2 + A1 \rightarrow A1$, increment $x_i$ source pointer, $A0 \rightarrow h_i$;
(first update of euen coefficient and store last odd coefficient)

cycle 2: $x_i \times T1 + A1 \rightarrow A1$, $h_i \rightarrow A0$
(second update of euen coefficient and load next odd coefficient)

cycle 3: $x_i \times T2 + A0 \rightarrow A0$, increment $x_i$ source pointer, $A0 \rightarrow h_i$;
(first update of odd coefficient and store last euen coefficient)

cycle 4: $x_i \times T1 + A1 \rightarrow A1$, $h_i \rightarrow A0$
(second update of odd coefficient and load next euen coefficient)

This also gives (1+4/2)/2 cycles/tap=1.5 cycles/tap. Similar techniques can be used for architectures having more than two MACs.

Robustness Scaling for Stability

Near end signals will disturb adaptation of the coefficients even to the point of adding echo or distorting the signal. A double talk detector is used to prevent adaptation during periods of near-end input. The double talk detector works on frame boundaries and does not turn off adaptation between boundaries. This can be for up to one frame time of thirty-two samples. The rest of the echo canceller should use a small step size in order to prevent divergence from the previously converged set of coefficients when this kind of double talk adaptation takes place.

Near-end background noise limits the amount of convergence that can be achieved by the algorithm. A small step size can guarantee convergence but at the cost of a larger error misalignment of the coefficients and slow convergence rate. A large step size gives a higher convergence rate but only in low-noise conditions. The stability limits discussed above show that the multiple error algorithm will have a lower upper bound for stability.

Robustness scaling works by using a large step size at initialization when the errors are large. As error diminishes a smaller step size is used. An increase of error after convergence is due either to double talk or a change in the echo path. The invention uses the following strategy to maintain a converged state, while allowing adaptation to a changing echo path:

1. Initialize the scale factor, $\Phi_0$, to a large stepsize.
2. Decreasing error lowers the step size at a rate given by a robustness time constant, $\tau$.
3. Increasing error increases the step size but the increase is delayed by $\tau$.
4. Error changes are limited by a scaled error limiting factor, $\xi$.

Step 1 assumes the filter will be converging from zero. Large errors can be expected. The scale will only change at the $\xi$-limited $\tau$ rate until the scale eventually gets below the error limit and approaches the error mean. At this point, the filter is converged and scale is small. An error larger than the low error limit signifies double talk or echo path change. This strategy assumes double talk in an interval given by the $\tau$ constant. The scale will be increased after this interval, if either the double talk detector does not disable adaptation or the error decreases (double talk goes away).

Scale factor, $\Phi_k$, affects the convergence rate during divergence. It is initialized to 0.1 and decreases as the filter taps converge to the room model. $\kappa$ is the limiting factor for scale update, currently set to 1.1. Convergence is assumed when scaled $|e_k|$ is less than 90% (for the current $\kappa$ value of 1.1) of the current scale.

The scale factor is updated using an-exponential window given by the robustness time constant $\tau$. An update increment of 1.8 times the last scale value is added to the window during divergence. Thus, the scale will grow but delayed by the time constant, $\tau$. Small errors as compared to $\kappa$ (i.e. during convergence) will add the increment $|e_k|/\beta$. In one embodiment of the invention, $\beta$ had the value 0.607. Thus, scale during convergence will follow the error energy biased by the value $1/\beta$.

Initial scale, $\Phi_0$, should be set to the rms value of the input signal. This is accomplished by letting the scale adapt during a period before echo cancellation is enabled. The adapted value of $\Phi$ provides a better starting point than using a fixed value of $\Phi$, which is used only at process initialization.

The implementation is as follows.

Scale Factor

The update equation is modified by a scale factor, $\Phi_k$, that is recalculated each sample as follows.

1. $\Phi_0$ is the initial scale value
2. $\Psi_k$ is the scale update value, based upon the current error magnitude.
3. $C_k = \Psi_k \Phi_k = \min(\kappa \Phi_\kappa |e_k|$. $\kappa$ gives the limiting factor on the scale. A ten percent change in scale error is used as the limit on the scale change. See T. Gansler, S. Gay, M. Sohndhi, and J Benesty, "Double talk robust fast converging algorithms for network echo cancellation", *IEEE Trans. on Speech and Audio Processing*, November 2000. A preferred implementation sets $\beta$ directly to approximate the error magnitude (rms) of the window.
4. When adaption is enabled, $\Phi_{k+1} = \tau \cdot \Phi_k + (1-\tau) \cdot \Phi_{min}$; which assumes that the scale should decay to the value of $\Phi_{min}$ over time between adaptation intervals. This prevents divergence upon the restart of adaptaion.

Alternatively, $\Phi_{k+1} = \Phi_k$ can be used, which assumes the current scale should be used during the next adaptation interval. The first method is more stable than the second method and is preferred.

Otherwise, $$\Phi_{k+1} = \alpha \Phi_k + (1-\alpha)\frac{C_\kappa}{\beta}$$

can be used instead, which assumes that the scale should follow the size of the adaptation error with $\beta$ being a bias that accounts for the distribution the error data. Gansler et al. (ibid.) relates $e_\kappa$ to $\beta$ but this overcomplicates tuning the algorithm. b can be tuned to give good long term estimates of $|e_\kappa|$ in converged conditions.

The $\alpha$ used depends upon whether the loop is diverging or converging. If $$\frac{C_\kappa}{\beta} \leq \Phi_\kappa,$$

the loop is converging and $\alpha = \alpha_f$. Otherwise, the loop is diverging and $\alpha = \alpha_r$. This differs from the Benesty et al. patent in which only one rate is used for tracking error. The convergence rate $\alpha_f$ is set to give fast convergence on echo path change. The divergence rate $\alpha_r$ is set to delay divergence by the expected length of possible double talk detection errors. The adaptive filter will quickly track to a convergence condition. ar determines how long to prevent the track away from the current condition to a new one, such as required by echo path changes. The rates are tuned for each application.

Error Update Calculation Smoothing

The robust error, $e_k$, is used in the coefficient update calculation, based on the scale factor, as given by the following.

$$e'_k = C_\kappa \text{sign}(e_k)$$

This replaces the error value used in the algorithm of the prior section. Thus, $e'_k$ is the value of the error used in the update algorithm that limits the amount of divergence from a convergent condition by means of the time constant and κ, the error magnitude limit.

Operation

Adaptation should be disabled when no echo is present and during double talk; i.e. when there is no signal to train on such that the filter will train to the background noise of the room, or when the filter will train to the near-end source. Cancellation occurs in all modes when the filter is in a convergent state. When adaptation is disabled, the echo path may change over time and the estimate will diverge. Thus, leakage should be used to unlearn (clear) the model in a time dependent fashion when adaptation is not being requested.

Quantization errors can accumulate in the coefficients as they are updated. Leakage prevents accumulation of errors.

Background noise will affect the achievable cancellation performance. Background noise can cause instability at a certain point. Decreasing the step size decreases tracking convergence but increases the times during which adaptation can take place in the presence of noise. The tuning of the relaxation stepsize, and exponential envelope parameters for the expected echo environment is essential. This environment includes the amount (length of time and strength) of double talk adaptation that may occur. Robust step size control, as described in the next section, is used to keep the algorithm stable in double talk environment.

Stability and Convergence

Mean square error analysis of the LMS, and multiple error LMS, gives the following result for the stability limit (the step size limits for guaranteed convergence) of each algorithm; see S. Douglas, "Analysis of the Multiple-Error and Block Least-Mean_Square Adaptive Algorithms", *IEEE Transactions on Circuits and Systems—II: Analog and Digital Signal Processing*, Vol. 42, No. 2, February 1995

$$0 < \mu < \frac{2}{(4N-1)tr[R]}$$

where μ is the step size, N is the number of errors used in the update, and R is the data correlation matrix summed over the input delay vector of length N at time k $$\sum_{i=0}^{N-1} E[x_{k-i}x_{k-i}^T].$$

This bound assumes that the input delay vectors are independent and the inputs simple, which is not really true. The bound is actually much stricter in practice, especially for correlated Gaussian input conditions. However, the given bound implies that as N increases the stability limit decreases by approximately 4*N. Normalization effectively removes the effect of tr[R] from the right-hand side. tr[R] is the sum of the diagonal terms of R (the trace of the matrix). Thus the limit is $$0 < \mu < \frac{2}{(4N-1)}.$$

Normalized least mean square with (N=1) requires a step size less than 0.67 and dual update (N=2) requires a step size less than 0.28, for non-zero near end white noise. This suggests that convergence of the multiple error algorithm diverges at a lower near-end noise condition than the nLMS algorithm, which has been observed in simulation of the invention. Statistical robustness techniques are used to maintain stability by dynamically scaling the step size to the stable range.

The invention thus provides a robust adaptive filter for noise reduction and an efficient method for adapting a programmable filter. Comparisons with other algorithms (single error update LMS and Fast Affine Projection (FAP)) show that, depending upon host processor, the invention uses 7.1–10.2 MIPS (million instructions per second), whereas single error update LMS uses 9.1–18.0 MIPS and FAP uses 12.2–20.4 MIPS. An adaptive filter constructed in accordance with the invention is relatively machine independent and is stable at low signal to noise ratios.

Having thus described the invention, it will be apparent to those of skill in the art that various modifications can be made within the scope of the invention. For example, circuits 72 and 83 (FIG. 7) are called "summation" circuits with the understanding that a simple arithmetic process is being carried out, which can be either digital or analog, whether the process entails actually subtracting one signal from another signal or inverting (changing the sign of) one signal and then adding it to another signal. Stated another way, "summation" is defined herein as generic to addition and subtraction.

What is claimed is:

1. In a telephone including an audio frequency circuit having a transmit channel, a receive channel, and at least one echo canceling circuit coupled between said channels, the improvement comprising:

an adaptive filter in said echo canceling circuit; and a coefficient update circuit coupled to said adaptive filter for modifying the coefficients in said adaptive filter in steps in response to an error signal and in accordance with a multiple error per sample over plural samples, least mean squares algorithm for reducing said error signal.

2. The telephone as set forth in claim 1 wherein the step size of said samples decreases near convergence.

3. The telephone as set forth in claim 1 wherein said algorithm is a normalized least mean squares algorithm.

4. The telephone as set forth in claim 1 wherein said audio frequency circuit further includes a control circuit for interrupting adaptation of said filter during double talk conditions.

5. The telephone as set forth in claim 1 wherein said algorithm requires 7.1 to 10.2 MIPS to perform the adaptive filter and coefficient update for a single tap.

6. A method for reducing echo in a telephone, said method comprising the steps of:

filtering a first signal with a filter having adaptive coefficients;

detecting an error signal based on a difference between the filtered first signal and a second signal; and modifying the adaptive coefficients in steps in response to the error signal and in accordance with a multiple error per sample over plural samples, least mean squares algorithm.

7. The method as set forth in claim 6 and further comprising the steps of:

monitoring signals within said telephone to detect double talk; and interrupting said modification step in response to a detection of double talk.

8. The method as set forth in claim 6 and further comprising the steps of:

monitoring signals within said telephone to detect double talk; and delaying said modification step in response to a detection of double talk.

9. The method as set forth claim 6 wherein the first signal is from a microphone and the second signal is output to a speaker, whereby said method reduces acoustic echo in said telephone.

10. The method as set forth claim 6 wherein the first signal is a line input signal and the second signal is a line output signal, whereby said method reduces line echo in said telephone.

* * * * *